(12) United States Patent
Jung et al.

(10) Patent No.: US 7,382,545 B2
(45) Date of Patent: Jun. 3, 2008

(54) LIQUID ZOOM LENS

(75) Inventors: Ha Yong Jung, Suwon (KR); Jae Young Bae, Suwon (KR); Sung Chan Kim, Seoul (KR); Jin Hyuck Yang, Suwon (KR); Young Ho Lee, Yongin (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 11/582,395

(22) Filed: Oct. 18, 2006

(65) Prior Publication Data

US 2007/0097515 A1 May 3, 2007

(30) Foreign Application Priority Data

Nov. 1, 2005 (KR) .................. 10-2005-0103790

(51) Int. Cl.
*G02B 3/12* (2006.01)
*G02B 1/06* (2006.01)
(52) U.S. Cl. ....................... 359/666; 359/665
(58) Field of Classification Search ................ 359/665, 359/666, 667, 676
See application file for complete search history.

(56) References Cited

U.S. PATENT DOCUMENTS 5,956,183 A * 9/1999 Epstein et al. ............... 359/666

2005/0041301 A1 * 2/2005 Kibayashi .................. 359/666
2006/0152818 A1 * 7/2006 Shum et al. ................ 359/696

FOREIGN PATENT DOCUMENTS

KR 10-2005-0033308 4/2005

* cited by examiner

*Primary Examiner*—Scott J. Sugarman
*Assistant Examiner*—Darryl J. Collins

(57) ABSTRACT

A liquid zoom lens mounted on a portable terminal is provided. In the liquid zoom lens, a cylindrical body has upper and lower openings to which one pair of lenses is coupled. An auto-focus lens part includes a first insulating liquid layer, a first electrolyte layer, and a first lens. The first insulating layer and the first electrolyte layer are disposed to form an interface at a lower portion of the body. The first lens is disposed on the first electrolyte layer and has a periphery closely attached to a lower portion of an inner periphery of the body. An optical zoom lens part includes a second insulating liquid layer, a second electrolyte layer, and a second lens. The second insulating liquid layer and the second electrolyte layer are disposed to form an interface on the first lens. The second lens is fixed to be movable within the second insulating liquid layer, such that a periphery is closely attached to the inner periphery of the body. Accordingly, the auto-focus function and the optical zoom function can be simultaneously achieved through a single liquid lens whose curvature is varied by the difference of the inherent refractive index between the electrolyte and the insulating liquid.

13 Claims, 4 Drawing Sheets

[FIG. 1]
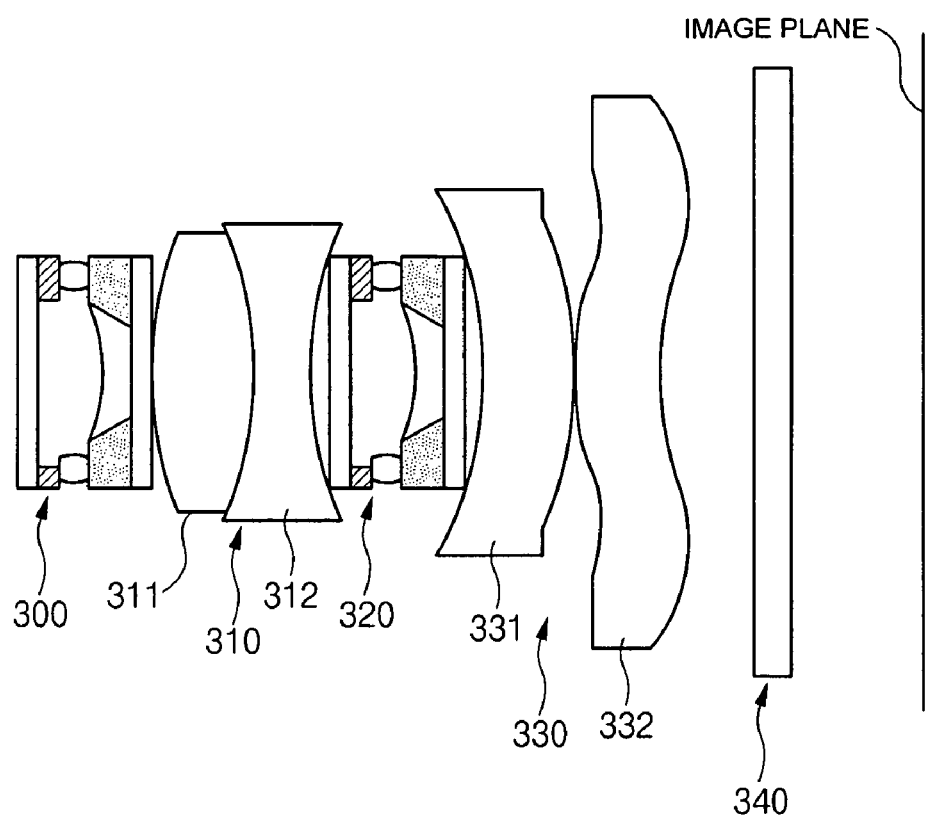
[FIG. 2]
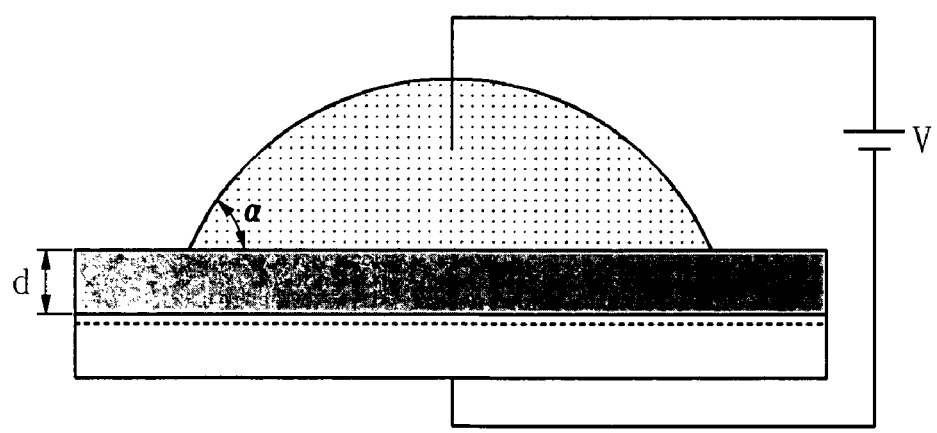

[FIG. 3]
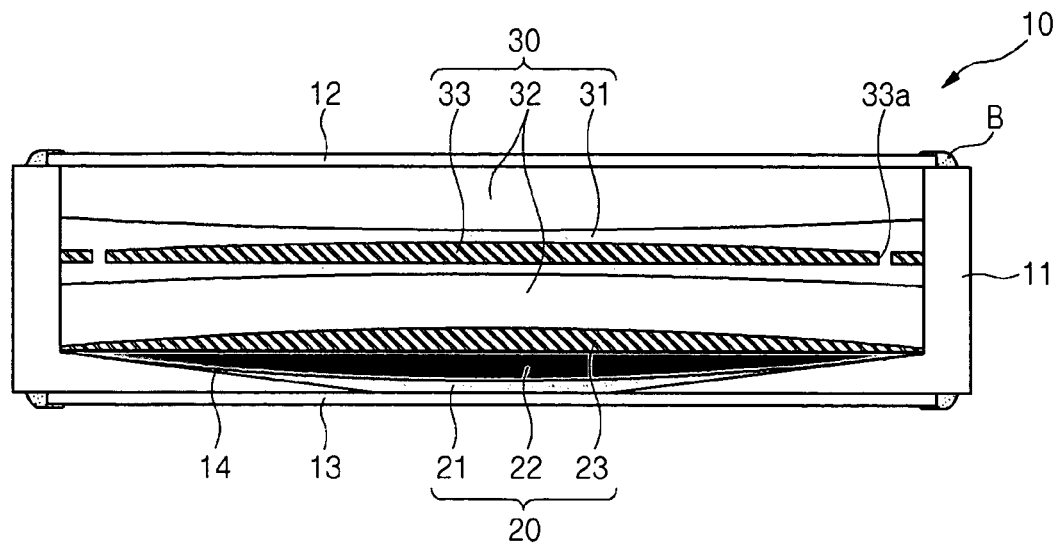
[FIG. 4]
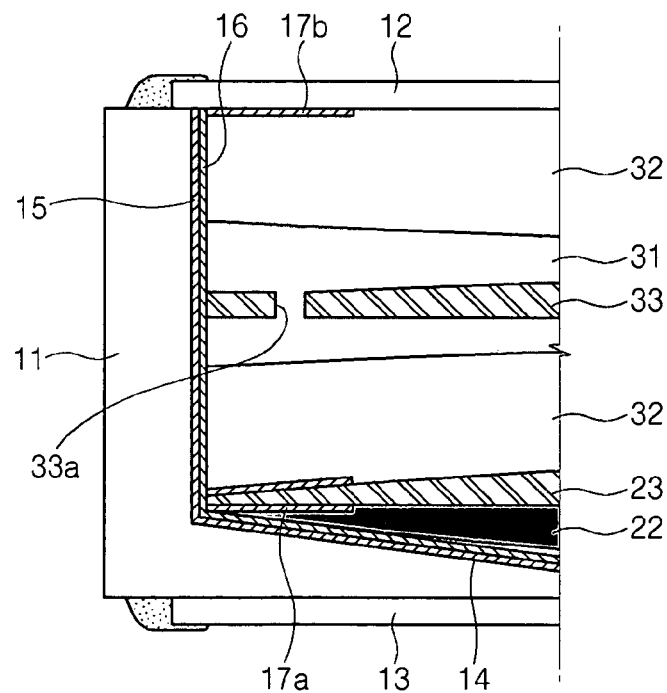

[FIG. 5]
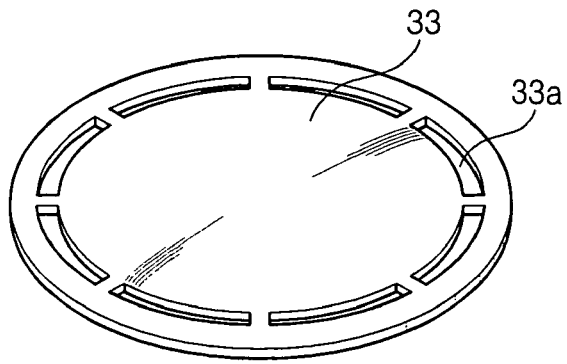
[FIG. 6A]
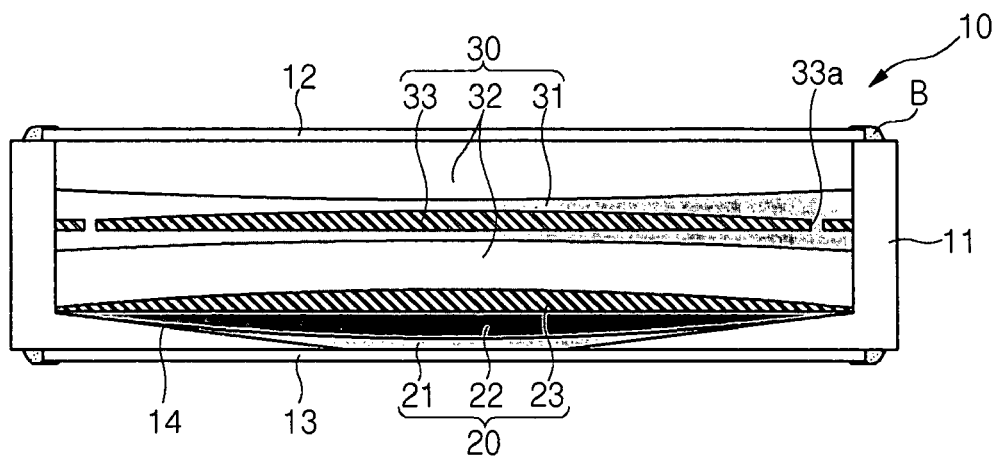
[FIG. 6B]
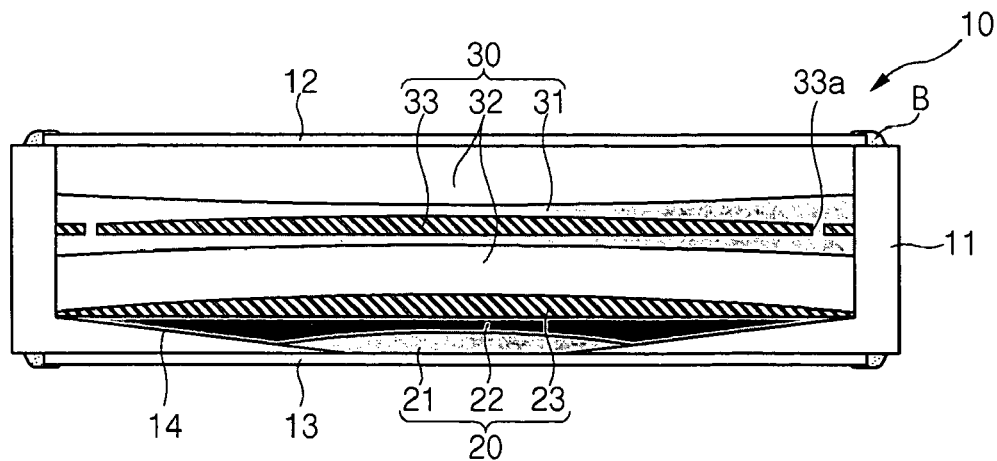

[FIG. 6C]
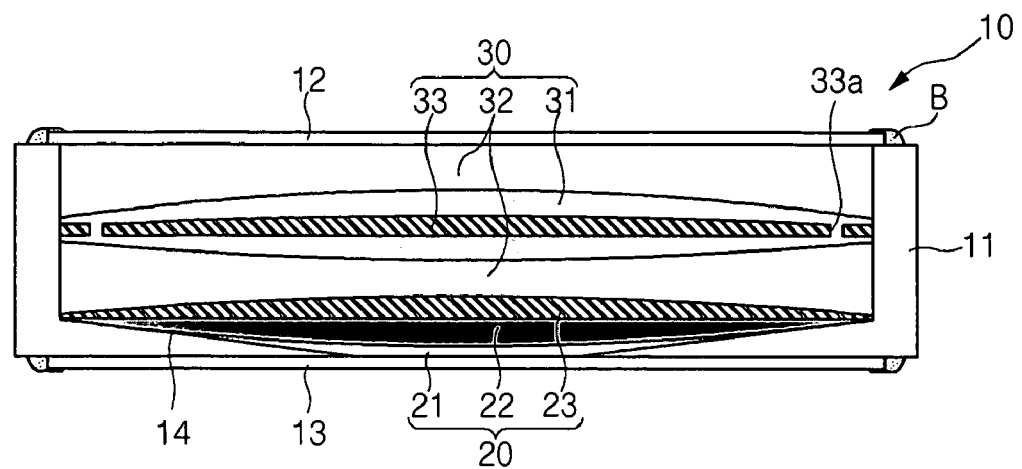
[FIG. 6D]
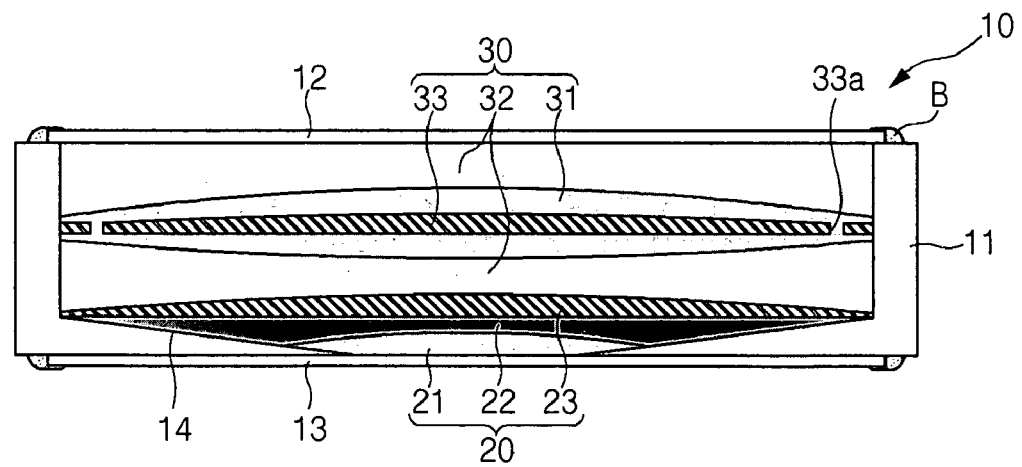

LIQUID ZOOM LENS

CROSS-REFERENCE TO RELATED APPLICATIONS

This application claims the benefit of Korean Patent Application No. 2005-103790 filed with the Korea Industrial Property Office on Nov. 1, 2005, the disclosure of which is incorporated herein by reference.

BACKGROUND OF THE INVENTION

1. Field of the Invention

The present invention relates to a liquid zoom lens for a portable terminal, and more particularly, to a liquid zoom lens that can provide an optical zoom function and an auto-focus function at the same time. In the liquid zoom lens, when a voltage is applied to the inside of a cylindrical body, the curvature of electrolyte and insulating liquid is varied. The electrolyte and the insulating liquid form a plurality of interfaces. Aspheric lenses are sequentially mounted to contact the interfaces or in the insulating liquid. The optical zoom function and the auto-focus function are achieved at the same time by the curvature variation of the electrolyte around the aspheric lens.

2. Description of the Related Art

Recently, cameras are built in portable terminals such as mobile phones or personal digital assistants (PDAs). Consumers give preference to the terminals with a built-in camera, which have high resolution and various functions. In these terminals with the built-in camera, lenses are attached to image pickup devices such as charge coupled device (CCD) or complementary metal oxide semiconductor (CMOS) elements. Thus, the terminals can take a picture of an object and can record data of the taken picture in a recording medium.

To provide the performance of mega-pixel cameras, the lens has to be designed to have sufficient resolution. In addition, the lens has to be designed to be larger than a real sensor size, considering the assembly tolerance.

A lens system is mounted on the portable terminal and used to take the image. In such a lens system, various kinds of aberrations are caused by incident light having different wavelengths when taking the image. The aberration causes the shape of the object to be distorted. Examples of the aberration include spherical aberration, astigmatism, and distortion. The lens system must be able to maximally prevent the aberration.

In the lens system, zoom is a function of providing a variable focal length. The zoom function is achieved by adjusting a distance between a front lens with a positive refractive index and a rear lens with a negative refractive index through their relative movement. To maximize the zoom function, a wide-angle lens or telephoto lens that can vary the focal length between an existing lens and an additional lens is separately attached to the camera. Therefore, the user can take the picture of the object at various viewing angles at one place without any movement.

The zoom can be classified into an optical zoom and a digital zoom. The optical zoom is to magnify the image of the object by a variable focal length while relatively moving an optical lens attached to the camera. The digital zoom is to magnify the image of the object within the CCD itself, as if the image is magnified using a graphic program such as Photoshop.

Unlike the optical zoom, because the digital zoom magnifies the image within the CCD, it needs no space for lens movement according to the variation of the focal length. Thus, the digital zoom is advantageous to the miniaturization and slim profile, but it cannot provide the high resolution.

On the other hand, because the optical zoom magnifies the image by the variation of the focal length between the lenses, it needs a space for the variation of the focal length. Due to a lens part and a lens barrel covering the lens part, the required space increases. However, the zoom lens provides the high resolution when zooming. Thus, in spite of the large volume of the terminal, the consumers prefer the optical zoom to the digital zoom.

As the currently available portable terminals tend to be smaller and slimmer, the digital zoom is preferred to the optical zoom because of the spatial limitation that can vary the focal length. Recently, the portable terminals that can provide the optical zoom function using the rear surface of the terminal are intermittently put on the market.

A technical structure of a conventional portable terminal that can provide the optical zoom is disclosed in Korean Patent Application No. 2003-3948, entitled "Lens Barrel Structure of Zoom Camera and Zoom Assembly". In Korean Patent Application No. 2003-3948, an improved lens barrel structure of the optical zoom used in the digital camera is applied to the conventional portable camera. Therefore, the lens barrel and zoom assembly of the zoom camera is small-sized and easy to manufacture, and provides high resolution.

The conventional zoom assembly includes a front lens with a positive refraction index, a rear lens with a negative refractive index, an inner lens barrel, and an outer lens barrel. The inner lens barrel has a helicoid groove to guide helicoid locus motion of the front lens and the rear lens. The outer lens barrel is inserted outside the inner lens barrel and has an escape groove to guide the up/down motion of the front lens and the rear lens.

In such a conventional zoom camera, the inner lens barrel and the outer lens barrel are installed such that they are foldable in multiple stages on one side of the portable terminal. The inner lens barrel and the outer lens barrel are sequentially expanded by the driving of a motor within the terminal and thus the focal length is varied by the movement of the lenses, thereby achieving the optical zoom function. Consequently, there occurs the problem that a large space for the zoom function is occupied in the inside of the camera.

In addition, the motor installed in the camera has to be driven so as to move the inner and outer lens barrels with a plurality of lenses to the outside of the zoom camera. Power is dissipated in driving the motor and thus power dissipation of the battery increases.

To solve these problems, a liquid lens has been developed which occupies a small space and has low power dissipation in the portable terminal. The liquid lens achieves the zoom function using electrolyte and insulating liquid. A curvature of the electrolyte varies according to a voltage applied to a single lens barrel, and the insulating liquid forms an interface adjacent to the electrolyte.

A typical liquid lens that can provide the zoom function is disclosed in Korean Patent Laid-open Publication No. 2005-33308, entitled "Zoom camera using the liquid lens for mobile phone, control system and method thereof." The conventional liquid lens will be described below with reference to FIG. 1.

FIG. 1 is a sectional view of a conventional liquid lens. Referring to FIG. 1, the conventional liquid lens includes a first lens group 310 having a first lens 311 with a positive refraction index and a second lens 312 with a negative refractive lens, a first liquid lens 300 in which a curvature radius of a contact surface between a conductive liquid and a non-conductive liquid is varied according to a zoom function control signal, a second lens group 330 having a third lens 331 with a positive refractive index and a fourth lens 332 with a negative refractive index, both sides of the third and fourth lenses 331 and 332 being aspheric, and an infrared filter 340 spaced apart from the second lens group 330 by a predetermined distance.

As illustrated in FIG. 2, the conventional liquid lens is based on an electrowetting phenomenon. The electrowetting phenomenon is caused because a surface tension of the interface is changed according to electric charges existing in the interface and thus its contact angle ($\alpha$) is changed. A thin insulator is provided in the interface so as to increase the potential difference applied to the interface, and electric charges existing in the electrolyte are intended to move to the interface because of chemical properties.

At this point, when an external electric field is applied, the properties of the electric charges become stronger. Specifically, in a triple contact line (TCL) where the interfaces are overlapped, the concentration of the electric charges is greatly increased. Thus, the surface tension at the edge of the droplet is lowered.

Using the electrowetting phenomenon, it is possible to easily control micro droplets and micro particles within the liquid. Therefore, various products using the electrowetting phenomenon have been recently studied. The range of application includes liquid lenses, micro pumps, display devices, optical devices, and microelectromechanical systems (MEMS).

Compared with a mechanical lens, a liquid lens for auto-focus has a small size, low power dissipation, and high response speed.

In spite of these advantages, because the conventional liquid lens achieves the zoom function by the variation of the curvature radius between the conductive liquid and the non-conductive liquid of the individual liquid lenses within the single lens barrel to which the lens groups and the liquid lens are connected, the spatial limitation just like in the optical zoom lens using the multistage barrel can be solved, but the single liquid lens performs only the zoom function by the variation of the curvature between the internal liquids.

Furthermore, the conventional liquid lens has a complex structure. To achieve other functions (e.g., the auto-focus (A/F) function) as well as the zoom function by using the single liquid lens, another liquid lens acting as a front lens has to be provided. Consequently, the structure of the liquid lens becomes more complex.

SUMMARY OF THE INVENTION

An advantage of the present invention is that it provides a liquid zoom lens that can provide the optical zoom function and the auto-focus function at the same time. In the liquid zoom lens, one pair of aspheric lenses is mounted inside a cylindrical body. An electrolyte layer and an insulating liquid layer surround the aspheric lenses and form a plurality of interfaces. As the curvatures of the electrolyte layer and the insulating liquid layer are sequentially varied by the applied voltage, the optical zoom function and the auto-focus function can be achieved at the same time.

Additional aspect and advantages of the present general inventive concept will be set forth in part in the description which follows and, in part, will be obvious from the description, or may be learned by practice of the general inventive concept.

According to an aspect of the invention, a liquid zoom lens includes: a cylindrical body having upper and lower openings to which one pair of glass lenses is coupled; an auto-focus lens part including a first insulating liquid layer, a first electrolyte layer, and a first lens, which form an interface at a lower portion of the body; and an optical zoom lens part including a second insulating liquid layer, a second electrolyte layer, and a second lens, the second insulating liquid layer and the second electrolyte layer being disposed to form an immiscible interface on the first lens.

According to another aspect of the present invention, disk-like glass lenses are fixedly attached to the upper and lower openings of the body. A plurality of liquid layers and lenses form a plurality of interfaces within the body, and are embedded into the portable terminal.

According to a further aspect of the present invention, the body may be formed of the same material as the body of the portable terminal, or may be formed of metal or ceramic. The body has a metal coating layer in the inner periphery such that it can act as an electrode. It is preferable that the coating surface is formed of gold (Au) that is less reactive to liquid.

According to a still further aspect of the present invention, the auto-focus lens part and the optical zoom lens part stacked in the inside of the body include the insulating liquid layer, the electrolyte layer and the lens in the multi-layer structure, thus forming a plurality of interfaces. The insulating liquid layer and the electrolyte layer of the auto-focus lens part are separated from the optical zoom lens part by the first lens whose outer periphery is closely attached to the inner lower portion of the body.

According to a still further aspect of the present invention, the optical zoom lens part includes the electrolyte layer and the insulating liquid layer above the auto-focus lens part. An insulating liquid layer including the second lens at the center portion is interposed between the electrolyte layer and the insulating liquid layer. Thus, the electrolyte layer and the insulating liquid layer form the upper and lower interfaces and are surrounded by one pair of the electrolyte layers formed of the same or different physical properties. The second lens is fixed to the center portion of the insulating liquid layer. In addition, a plurality of holes are formed in the edge of the lens, such that the insulating liquid is movable up and down around the second lens.

Preferably, the lenses of the auto-focus lens part and the optical zoom lens part are aspheric lenses. More preferably, the lenses are transparent aspheric lenses formed of plastic. Accordingly, chromatic aberration that occurs in the liquid lens can be corrected.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a sectional view of a conventional liquid lens;

FIG. 2 is a schematic view for explaining an electrowetting phenomenon of a liquid lens;

FIG. 3 is a sectional view of a liquid zoom lens according to the present invention;

FIG. 4 is a partially enlarged sectional view of a body of the liquid zoom lens according to the present invention;

FIG. 5 is a perspective view of a second lens fixed to a second insulating liquid layer composing an optical zoom lens part of the liquid zoom lens according to the present invention; and FIGS. 6A to 6D are sectional views illustrating a driving process of the liquid zoom lens according to the present invention.

DETAILED DESCRIPTION OF THE
PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Structure of Liquid Zoom Lens

FIG. 3 is a sectional view of a liquid zoom lens according to the present invention, and FIG. 4 is a partially enlarged sectional view of a body of the liquid zoom lens illustrated in FIG. 3. Referring to FIGS. 3 and 4, the liquid zoom lens 10 includes a cylindrical body 11, an auto-focus lens part 20, and an optical zoom lens part 30. Glass lenses 12 and 13 are fixedly attached to upper and lower openings of the cylindrical body 11. A plurality of electrolyte layers 22 and 32 and insulating liquid layers 21 and 31 having different physical properties form a plurality of interfaces within the body 11 and are divided by the first lens 23.

The body 11 is formed of metal or ceramic. A lower bottom surface of the body 11 is inclined downwardly to the center portion, thus forming an inclined surface 14. The body 11 has the upper and lower openings. The periphery surfaces of one pair of the glass lenses 12 and 13 are fixed to the upper and lower edges of the body 11 by an adhesive B, thereby covering the upper and lower openings.

The inclined surface 14 of the bottom surface of the body 11 fixes the first insulating liquid layer 21, which is disposed at the lowermost portion, to the center portion of the body 11. When a voltage is applied and the interface is refracted, an entire size of the auto-focus lens part 20 is reduced by the inclined surface 14.

In the auto-focus lens part 20, the first insulating liquid layer 21 and the first electrolyte layer 22 have periphery portions contacting the inclined surface 14 and are formed of transparent liquid that has different physical properties but identical density, and are immiscible. The first insulating liquid layer 21 and the first electrolyte layer 22 are stacked. That is, the first lens 23 is disposed on the first electrolyte layer 22, thereby forming the auto-focus lens part 20.

When a voltage is applied to the first electrolyte layer 22 forming the interface with the first insulating liquid layer 21 disposed at the lowermost portion, the first insulating liquid layer 21 becomes convex due to the variation of the curvature of the first electrolyte layer 22 that is the conductive liquid. In this manner, the auto-focus function is achieved.

The first lens 23 of the auto-focus lens part 20 is formed of an aspheric plastic lens whose upper surface is convex. The periphery portion of the first lens 23 is closely attached to the bent portion defined in the lower portion of the inner periphery of the body 11. Therefore, the auto-focus lens part 20 including the first electrolyte layer 22 and the first insulating liquid layer 21 and the optical zoom lens part 30 including the second electrolyte layer 32 and the second insulating liquid layer 31 are separated from each other by the first lens 23.

It is preferable that the first lens 23 is formed of an aspheric plastic lens such as cycloorefin copolymer (COC) or polycarbonate (PC).

When one side of the first lens 23 formed of the plastic material is used as the upper and lower cover contacting external air, the liquid inside the body may penetrate the lens and be discharged outside. However, according to the present invention, when the same liquids or different liquids are contacted on both sides, the penetration between the liquids does not occur.

Moreover, when the first lens 23 is formed of the aspheric lens whose one side is convex, it is possible to correct various aberrations such as the spherical aberration, astigmatism, and distortion, which may occur in using the liquid lens.

The optical zoom lens part 30 is formed on the auto-focus lens part 20. The optical zoom lens part 30 includes the second insulating liquid layer 31 and the second electrolyte layer 32, which are formed of liquids having different physical properties. The second insulating liquid layer 31 and the second electrolyte layer 32 form a plurality of interfaces. The second lenses 33 are fixed to the center portion of the second insulating liquid layer 31 such that it is movable within a predetermined range.

At this point, due to the voltage applied to the second electrolyte layer 32, one pair of the second electrolyte layers 32 is symmetrically refracted and thus the upper and lower portions of the second insulating liquid layer 31 become convex. In this manner, the optical zoom function is achieved.

Like the first lens 23, the second lens 33 fixed to the inside of the second insulating liquid layer 31 is formed of an aspheric plastic lens. Thus, hydrophobic coating layers are formed on both sides, and a plurality of holes 33a are formed along the periphery at equal distances.

The reason for forming the hydrophobic coating layers on the second lens 33 is that the stable operation can be obtained by fixing the second lens 33 to the insulating liquid in such a manner that the second insulating liquid layer 31 of the oil type surrounding the second lens 33 can be easily adsorbed into the lens surface.

In addition, because the second insulating liquid layer 31 surrounding the second lens 33 mutually flows through the holes 33a of the periphery of the lens 33 around the second lens 33, the upper and lower portions of the second insulating liquid layer 31 are symmetrical to each other and thus are equally refracted, thus obtaining the stable optical zoom function.

Meanwhile, the insulating liquid and the electrolyte, which are stacked to form a plurality of interfaces at the auto-focus lens part 20 and the optical zoom lens part 30, have different properties. In the electrolyte, $H_2O$ is a main component and inorganic salt and polar solvent are added. In the insulating liquid, silicon oil is a main component and nonpolar solvent is added. Thus, when the electrolyte and the insulating liquid contact each other, they are not mixed and form the interface with a predetermined curvature.

Moreover, since the liquids of the first electrolyte layer 22 and the second electrolyte layer 32 have the same constituent but different compositions, they have different physical properties. Likewise, the insulating liquids of the first insulating liquid layer 21 and the second insulating liquid layer 31 have the same constituent but different physical properties. The insulating liquid having higher wetting with respect to the surface than the insulating liquid of the first insulating liquid layer 21 is used.

The densities of the electrolyte and the insulating liquid forming a plurality of interfaces are almost identical. The refractive index of the basic electrolyte is maintained at 1.40 or less, and the refractive index of the insulating liquid is maintained at 1.45 or more. As the difference between the refractive indexes of the electrolyte and the insulating liquid becomes greater, they can be advantageously applied to the liquid lens.

As illustrated in FIG. 4, a metal coating surface 15 is formed on the body 11 of the liquid zoom lens 10 such that the inner periphery thereof can act as an electrode. The coating surface 15 may be formed of gold (Au), which is less reactive when it contacts various liquids.

In addition, an insulating coating layer 16 is formed on the metal coating layer 15 such that it forms an insulating surface with a plurality of liquids. Expanded coating layers 17a and 17b are formed on the boundaries of the periphery of the electrolyte layers 21 and 31 so as to apply a voltage to the electrolyte layers 22 and 23. Thus, the electric signal applied to the body 11 is applied to the electrolytes through the coating layers 17a and 17b connected thereto.

FIG. 5 is a perspective view of the second lens fixed to the second insulating liquid layer composing the optical zoom lens part of the liquid zoom lens according to the present invention. Referring to FIG. 5, the second lens 33 is formed of a disk-like aspheric plastic lens whose top surface is convex. A plurality of holes 33a are formed along the periphery of the second lens 33 at the equal distances. The second lens 33 is surrounded by the second insulating liquid layer 31 and is closely attached to the inner periphery of the body 11.

The second lens 33 is coated with the hydrophobic coating layer in order for the easy adsorption of the second insulating liquid layer 31 surrounding the outer periphery of the second lens 33. In some cases, the second lens 33 may be formed of the same insulating coating layer as the inner periphery of the body 11.

When a voltage is applied to the second insulating liquid layer 31 surrounding the second lens 33, or when the curvature of the second insulating liquid layer 31 is varied by an external impact, the insulating liquid flows through the holes 33a formed at the edge of the second lens 33. Therefore, the insulating liquid layer 31 disposed at the upper and lower portions of the second lens 33 can uniformly move, thereby maintaining the up and down balance.

Operation of Liquid Zoom Lens

FIGS. 6A to 6D are sectional views illustrating a driving process of the liquid zoom lens according to the present invention. Specifically, FIG. 6A is a sectional view of an initial state of the liquid zoom lens before the voltage is applied, FIG. 6B is a sectional view of the liquid zoom lens when the voltage is applied to the auto-focus lens part, FIG. 6C is a sectional view of the liquid zoom lens when the voltage is applied to the optical zoom lens part, and FIG. 6D is a sectional view of the liquid zoom lens when the voltage is applied to both the auto-focus lens part and the optical zoom lens part.

Referring to FIG. 6A, in the initial state in which the voltage is not applied, the first insulating liquid layer 21 of the auto-focus lens part 20 and the second insulating liquid layer 31 of the optical zoom lens part 30 are maintained at the thinnest state. At this point, the first electrolyte layer 22 and the second electrolyte layer 32 surrounding the first insulating liquid layer 21 and the second insulating liquid layer 31 form a predetermined curvature together with the insulating liquid layers 21 and 31, thus forming the interfaces.

Referring to FIG. 6B, when the voltage is applied to the auto-focus lens part 20 disposed under the body 11 so as to drive the auto-focus operation, the voltage is applied to the coating layer 17a disposed under the periphery of the first electrolyte layer 21 through the metal coating layer 15 formed on the inner periphery of the body 11. Therefore, the first electrolyte layer 22 contacting the bottom surface of the first lens 23 is driven and the curvature of the interface is varied. The first insulating liquid layer 21 whose bottom surface contacts the glass lens 13 as much as the curvature variation of the first electrolyte layer 22 is refracted, thus driving the auto-focus lens part 20.

The difference in the refractive index between the two liquids composing the first insulating liquid layer 21 and the first electrolyte layer 22 ranges from 0.05 to 0.1. When the difference in the refractive index between the two liquids is above 0.1, the focal length of the auto-focus is so excessive that the accurate adjustment of the focus is difficult in the zoom operation. On the other hand, when the difference in the refractive index between the two liquids is below 0.05, the curvature variation of the interface between the two layers is slight. Thus, it is difficult to focus on the object even when the zoom operation is not performed.

Referring to FIG. 6C, when the voltage is applied to the body 11, the voltage is applied to the coating layer 17b disposed above the periphery of the second electrolyte layer 32 through the metal coating surface 15 formed on the inner periphery of the body 11. Thus, the optical zoom lens part 30 is driven. One pair of the second electrolyte layers 32, which contact the first lens 23 and the bottom surface of the glass lens 12, are driven. The curvature of the interface with the second insulating liquid layer 31 is varied. The upper and lower portions of the second insulating liquid layer 31 disposed between the second electrolyte layers 32 are refracted in a convex shape according to the variation of the interface, thus driving the optical zoom lens part 30.

At this point, the magnifying power (×1, ×2, ×3) of the optical zoom can be adjusted according to the curvature variation of the interface formed between the second insulating liquid layer 31 and the second electrolyte layer 32.

The difference in the refractive index between the two liquids of the second insulating liquid layer 31 and the second electrolyte layer 32 ranges from 0.08 to 0.15. When the difference in the refractive index between the two liquids is above 0.15, the accurate adjustment of the focus is difficult in the auto-focus operation due to the excessive zoom. On the other hand, when the difference of the refractive index between the two liquids is below 0.08, the curvature of the interface between the two liquids is not almost varied. Thus, the zoom function is not smoothly performed.

Referring to FIG. 6D, when a voltage is applied to both the coating layers 17a and 17b through the metal coating layer 15 formed on the inner periphery of the body 11, the first electrolyte layer 22 and the second electrolyte layer 32 are driven at the same time. Thus, the curvatures of the insulating liquid layers 21 and 31 forming the interface with the electrolyte layers 22 and 32 are varied so that the optical zoom function and the auto-focus function are performed at the same time.

According to the liquid zoom lens of the present invention, the insulating liquid layers 21 and 31 and the electrolyte layers 22 and 32 form a plurality of interfaces within the inside of the cylindrical body 11, and the auto-focus lens part 20 and the optical zoom lens part 30 are provided in the multi-layer structure. In addition, the aspheric plastic lenses 23 and 33 are mounted inside the auto-focus lens part 20 and the optical zoom lens part 30, respectively. When the voltage is applied to the lens parts 20 and 30, the electrolyte layers 22 and 32 and the insulating liquid layers 21 and 31 forming the plurality of interfaces are refracted at a predetermined refractive index. Thus, the auto-focus function and the optical zoom function can be simultaneously achieved through the lens parts 20 and 30 in the single liquid lens.

As described above, when the voltage is applied to the body in such a state that the electrolyte and the insulating liquid forming a plurality of interfaces are sequentially filled in the single cylindrical body, the auto-focus function and the optical zoom function can be simultaneously achieved through the single liquid lens whose curvature is varied due to the difference in the inherent refractive index between the electrolyte and the insulating liquid. Furthermore, both sides of the second lens mounted on the optical zoom lens part are formed of the hydrophobic coating surface. Thus, the insulating liquid for the zoom operation is fixed around the second lens, thus obtaining the stable zoom function.

Moreover, because the first and second lenses mounted on the lens parts of the liquid zoom lens are formed of the aspheric plastic lenses, it is possible to correct the aberration that may occur when the liquid lens is used.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A liquid zoom lens comprising:
   a cylindrical body having upper and lower openings to which one pair of lenses is coupled;
   an auto-focus lens part including a first insulating liquid layer, a first electrolyte layer, and a first lens, the first insulating layer and the first electrolyte layer being disposed to form an interface at a lower portion of the body, the first lens being disposed on the first electrolyte layer and having a periphery closely attached to a lower portion of an inner periphery of the body; and
   an optical zoom lens part including a second insulating liquid layer, a second electrolyte layer, and a second lens, the second insulating liquid layer and the second electrolyte layer being disposed to form an interface on the first lens, the second lens being fixed to be movable within the second insulating liquid layer, such that a periphery is closely attached to the inner periphery of the body.

2. The liquid zoom lens according to claim 1, wherein the body is made of one of metal and ceramic and a bottom surface of the body is inclined downwardly toward a center portion thereof, thereby forming an inclined surface.

3. The liquid zoom lens according to claim 1, wherein the first lens is formed of an aspheric plastic lens based on cycloorefin copolymer (COC) or polycarbonate (PC).

4. The liquid zoom lens according to claim 1, wherein the second insulating liquid layer and the second electrolyte layer of the optical zoom lens part are formed of liquids having different physical properties to thereby form a plurality of interfaces, the second electrolyte layer is disposed under and above the second insulating liquid layer, and the second lens is fixed to be movable in the center portion of the second insulating liquid layer.

5. The liquid zoom lens according to claim 4, wherein the second lens is formed of an aspheric plastic lens based on cycloorefin copolymer (COC) or polycarbonate (PC).

6. The liquid zoom lens according to claim 4, wherein the second lens includes hydrophobic coating layers formed on both sides, and a plurality of holes formed along an edge at equal distances.

7. The liquid zoom lens according to claim 1, wherein the body includes a metal coating surface formed of gold (Au) at the inner periphery.

8. The liquid zoom lens according to claim 7, further comprising:
   an insulating (parylene) coating layer disposed on the metal coating surface formed in the inner periphery of the body to thereby form an insulating surface with a plurality of liquids.

9. The liquid zoom lens according to claim 8, further comprising:
   an expanded coating layer formed in the interface of the peripheries of the electrolyte layers so as to transfer a voltage applied to the electrolyte layers.

10. The liquid zoom lens according to claim 1 wherein the difference in the refractive index between the liquids of the first insulating liquid layer and the first electrolyte layer ranges from 0.05 to 0.1.

11. The liquid zoom lens according to claim 4, wherein the difference in the refractive index between the liquids of the second insulating layer and the second electrolyte layer ranges from 0.08 to 0.15.

12. The liquid zoom lens according to claim 1, wherein the electrolyte layer includes $H_2O$ as a main component, and an inorganic salt and polar solvent as an additive component.

13. The liquid zoom lens according to claim 1, wherein the insulating liquid layer includes a silicon oil as a main component and a nonpolar solvent as an additive component.

* * * * *

UNITED STATES PATENT AND TRADEMARK OFFICE
CERTIFICATE OF CORRECTION

PATENT NO. : 7,382,545 B2 Page 1 of 1
APPLICATION NO. : 11/582395
DATED : June 3, 2008
INVENTOR(S) : Ha Young Jung et al.

It is certified that error appears in the above-identified patent and that said Letters Patent is hereby corrected as shown below:

Column 10, Line 36, after "claim 1" insert --,--.

Signed and Sealed this

Twenty-first Day of October, 2008

JON W. DUDAS
*Director of the United States Patent and Trademark Office*